United States Patent [19]
Fish et al.

[11] Patent Number: 5,805,812
[45] Date of Patent: Sep. 8, 1998

[54] COMMUNICATION SYSTEM FOR THE REMOTE CONTROL OF EQUIPMENT

[75] Inventors: Nathan S. Fish, Plano; Andrew J. Berner, Irving; Sarah V. Denney, Allen, all of Tex.

[73] Assignee: Electronic Data Systems Corporation, Plano, Tex.

[21] Appl. No.: 647,552

[22] Filed: May 15, 1996

[51] Int. Cl.[6] ........................................ G06F 17/00
[52] U.S. Cl. .................................................. 395/200.38
[58] Field of Search .................. 395/200.38, 200.41, 395/200.53, 200.54, 200.82; 340/825.22, 825.23, 825.24, 825.25, 825.07; 348/211, 213

[56] References Cited

U.S. PATENT DOCUMENTS 4,321,625  3/1982  Smith ...................................... 348/213
5,589,878  12/1996  Cortjens et al. ........................ 348/211

*Primary Examiner*—Ellis B. Ramirez
*Attorney, Agent, or Firm*—Anthony E. Peterman; L. Joy Griebenow

[57] ABSTRACT

A communication system (10) has a first computer (20), central controller (16) and controlled equipment (18). An operator may enter a desired performance by equipment (18) on first computer (20) which is placed in a communications packet with a device number, channel number, and one or more parameters and then sent to central controller (16) for processing. Central controller (16) loads the parameters into memory (270) and calls an appropriate function that uses the parameters to carry out the desired performance of the equipment (18). The receipt and processing of the communication packet may be acknowledged by the central controller (16) to computer (20).

19 Claims, 6 Drawing Sheets

COMMUNICATION SYSTEM FOR THE REMOTE CONTROL OF EQUIPMENT

TECHNICAL FIELD OF THE INVENTION

This invention relates in general to software-based control systems and methods and more particularly to a communication system and method for remote control of equipment.

BACKGROUND OF THE INVENTION

In a number of situations it is desirable to control electronic equipment with a remote control system. Such systems allow for an array of equipment to be controlled from one or more control panels, which may be in the same room or a great distance away. Such remote control systems may allow a user to control many devices simultaneously with the press of a button. For example, with the press of a button, an operator may be able to dim lights, lower a screen for a projector, or start a video presentation. Such control systems also make it possible to have programmed schedules for controlling equipment.

There are a number of manufacturers and vendors of equipment related to remote control systems. One vendor is the AMX Corporation of Dallas, Tex. A typical AMX system for controlling equipment includes four major components: control panels, central controllers, device interfaces, and the controlled devices. The control panel(s) may be an infrared-transmitter-base panel, a radio-frequency-transmitter-base panel, a touch panel, or a personal computer. The central controller may be AMX's card frame, accent$^2$, or AXB-EM232. The devices that an AMX System may control include lighting equipment, drapes or curtains, screen motors, video projectors, video monitors, audio systems, laser disk players, VCRs, switchers, slide projectors, and the like.

Remote control systems can use a personal computer (client computer) to work with the central controller and device interfaces to control equipment or devices. Software applications are provided by AMX, for example, to help program a personal computer to interface with the central controller. The software previously available, however, has shortcomings.

For example, with AMX's software arrangement, a specific program segment must be written for each desired function for each individual device. This makes maintenance difficult, the addition of new equipment and reconfiguring of equipment difficult, and the software less efficient in general. Furthermore, such a system has limited two-way communication between a client computer and a controller of the equipment. For examples the software does not provide for true function calls from an external source.

SUMMARY OF THE INVENTION

Therefore, a need has arisen for a software-based system that provides full two-way communication between a client computer and a central controller for remote-controlled equipment. A further need exists for a communication system for the remote control equipment that includes the ability to perform a true function call that passes parameters from a client computer to a central controller.

In accordance with an aspect of the present invention, a method is provided for remotely controlling equipment that includes the steps of developing and sending from a programmable computer to a central controller a command with a device number, channel number and parameters representative of a desired control operation on remote control equipment, and the step of accepting and loading the command device number, channel number and parameters into memory of the central controller.

According to another aspect of the present invention, a computer system is provided for remotely controlling devices that includes a first computer having a first processor and first memory for operating the first computer program. The system also includes a central controller having a second processor and a second memory for operating a second computer program. The first computer and central controller are coupled with a communications link, allowing bidirectional communication between them. One or more remote-controlled devices are coupled to the central controller. The first computer is operable to run the first program to develop and send a command with a device number, channel number, and parameters corresponding to the desired performance of the remote-controlled device to the central controller. The central controller is operable to run the second program to accept and load the command device number, channel number and parameters into memory.

A technical advantage of the present invention is that a segment of software in the controller may be used for multiple physical devices based on the parameters passed, which may provide easier maintenance, more efficient software operation programming, and easier configuration of the system.

BRIEF DESCRIPTION OF THE DRAWINGS

For a more complete understanding of the present invention and advantages thereof, references is now made to the following description taken in conjunction with the accompanying drawings in which like reference numbers indicate like features and wherein.

DETAILED DESCRIPTION OF THE INVENTION

Preferred embodiments of the present invention are illustrated in FIGS. 1–6D, like numerals being used to refer to like and corresponding parts of the various drawings.

The present invention may be used in a variety of situations to provide for remote control from a first computer through a second computer (central controller) to the equipment for which control is desired. Furthermore, the invention may be carried out in a number of different programming languages and with numerous types of computers. The invention will be presented, however, for purposes of this disclosure in a context of using a personal computer to interface with an AMX control system. One application for this system is found in the Video Production System (VPS), developed by Electronic Data Systems Corporation, assignee of the present invention.

The VPS is an interactive broadcast facility for corporate training and informational broadcasts as well as academic training. VPS is designed to enable an instructor and a single assistant to operate an interactive broadcast television studio without the usual sizeable cast found in a traditional production studio, such as camera operators, producers, and directors. The cast is reduced by the use of the system, which is managed through VPS's touch-screen interface. The interface has been successfully implemented on a Windows platform using C++ and allows the operator to press buttons on the screen to control cameras, VCRs, and other equipment. By giving an instructor control over the studio, VPS enables the instructor to teach while controlling everything that participants see and hear.

As an example of how an aspect of the present invention may be used, a studio may have a number of cameras that are automated and electronically connected with the VPS system. If the instructor desires to use the buttons on the interface to move a camera, the system accommodates this request. The instructor merely selects the desired camera, pushes a left button, for example, in order to make the camera pan to the left. This example will be followed throughout the disclosure, but any number of control operations may be performed by the system on numerous types of electronic equipment.

Figure 1:
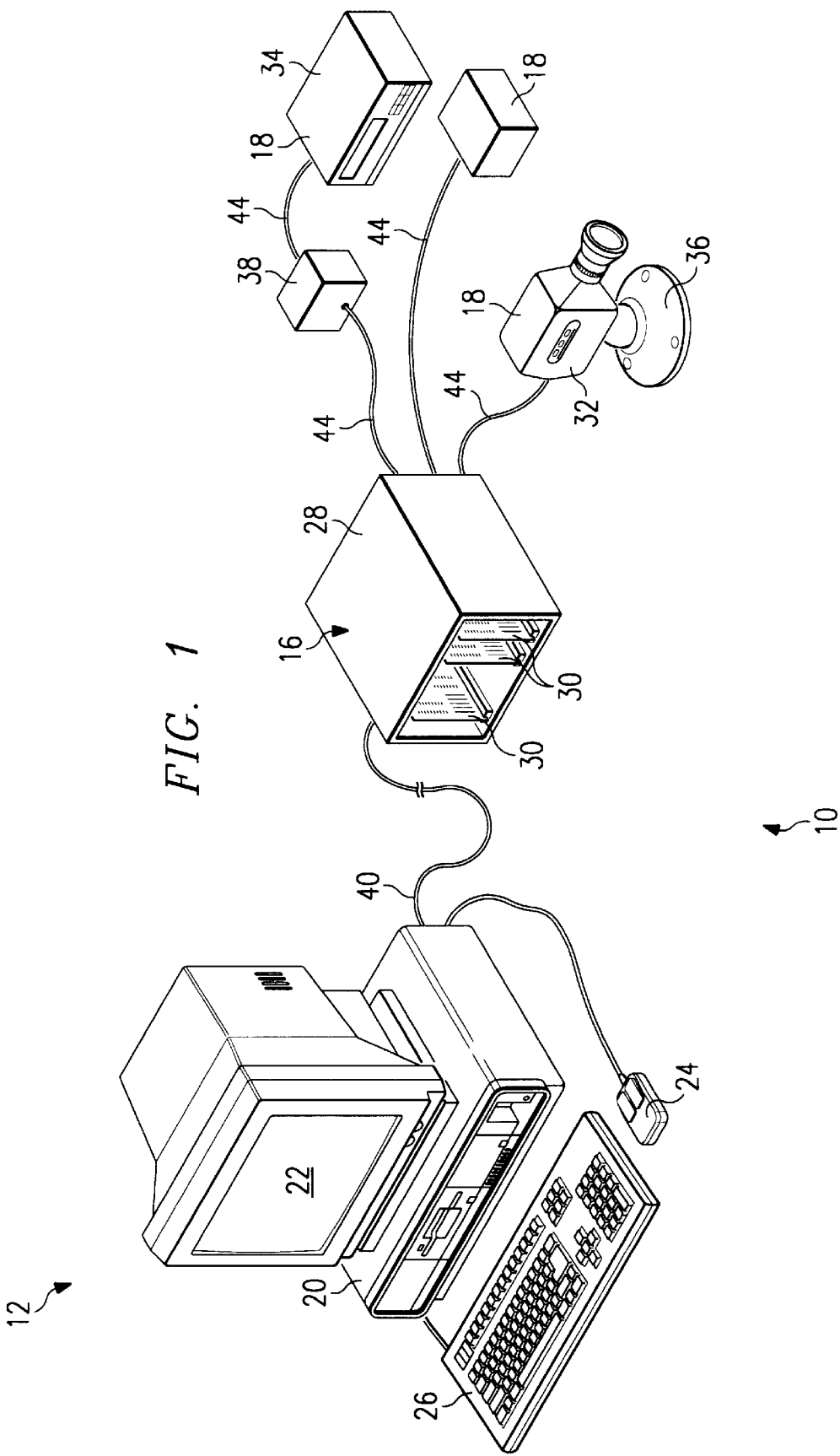
FIG. 1 is a perspective view of an exemplary system constructed in accordance with the present invention.

Referring to FIG. 1, system 10 is shown with a controlling device 12, central controller 16, and controlled equipment or devices 18. Controlling device 12 may be any of numerous types of processor-based devices having a user interface. Controlling device 12 is preferably a microprocessor-based computer such as an IBM-compatible type using an Intel 80×86 microprocessor such as a 80486 or Pentium. Computer 20 is preferably capable of running Microsoft Windows Version 3.1 or higher. Computer 20 will typically include components such as an internal hard drive or other suitable program memory, and/or one or more disc drives for uploading programs and data. Computer 20 may also include other devices such as a CD ROM drive, optical drive and other devices. Computer 20 includes a sufficient amount of internal memory to support its operating system as well as all applications utility software desired to run on computer 20.

Computer 20 may have a graphical user interface (GUI) that is presented to a user on screen 22. Screen 22 is preferably a touch screen for allowing input, but input may also be received from a pointing device 24, which may be any of a number of devices such as a mouse, a touch pad, a roller ball, or other devices. Computer 20 may also receive input from an operator through keyboard 26.

Central controller 16 includes a card frame 28 for receiving cards 30. Card frame 28 may be, for example, the card frame with AXC-EM and AXC-S cards available from AXM Corporation and which includes 16 front-access-control-card slots and 16 rear-mounted-control-cable jacks. Central controller 16 is preferably an AMX controller having a programmable master card, which will be described further below.

Controlled equipment or devices 18 may include a plethora of electronic devices. For example, controlled equipment 18 may include a camera 32 or a VCR 34. Camera 32 may include a camera-control device 36, such as a servo or motor. VCR 34 may have associated with it a box controller 38 which may be an AXB-232+ from AMX Corporation.

Numerous types of communication links may be used to transmit signals between controlling device 12, central controller 16, controlled equipment 18, and other devices such as box controller 38. Examples of suitable communication links include RS232 cables, a local area network (LAN), radio frequency communication links, infrared communication links, optical cables or telephone lines, or any other means for transmitting signals over a distance. In the specific embodiment shown, cable 40 is used as a communication link between controlling device 12 and central controller 16. Cable 44 is used between central controller 16 and controlled equipment 18.

Figure 2:
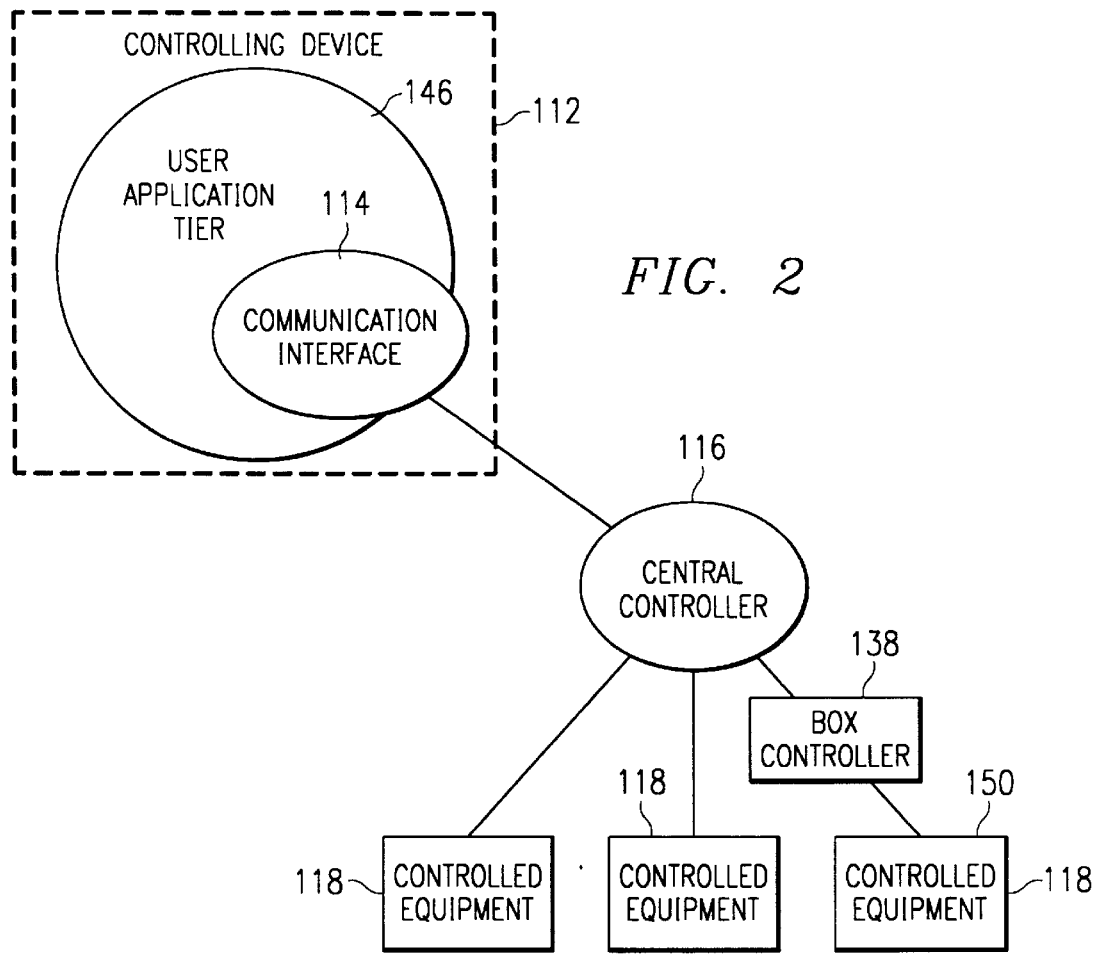
FIG. 2 is a block diagram of the architecture of the system of FIG. 1.

Referring to FIG. 2, a block diagram of the architecture of system 10 is presented. In the architecture shown, the controlling device 112 may include a user application tier 146 associated with communication interface 114. Communication interface 114 is linked with central controller 116, which is preferably the AMX AXCESS system. The central controller 116 is, in turn, linked to the controlled equipment 118. A box controller 138 may be included between central controller 116 and controlled equipment 118, such as in the case of controlled equipment 150.

In the preferred embodiment, the software for controlling many of the features of system 10 are programmed using C++ on controlling device 112. The family of C++ classes developed in the software of controlling device 112 may include a communication interface class called ADSAMXcomm, which encapsulates the two-way messages passing between the controlling device 112 and the central controller 116. The architecture of FIG. 2 will be more fully understood when considered in connection with FIGS. 3 and 4.

Figure 3:
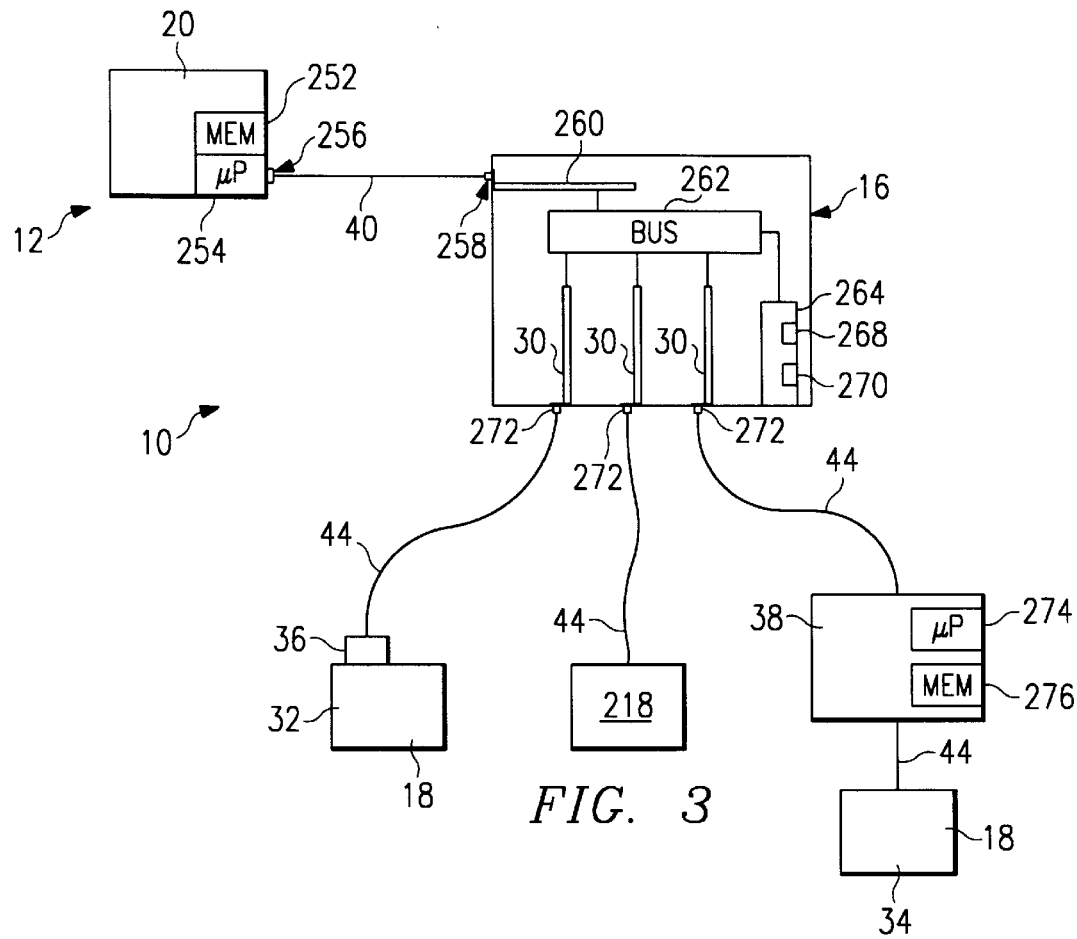
FIG. 3 is a block diagram showing additional details of the system of FIG. 1.

Referring to FIG. 3, a functional schematic of aspects of system 10 is shown. Computer, or first computer, 20 is shown having a first memory device 252 and a processor 254. Computer 20 is also shown with a port 256, which may be a serial port for use with communication cable 40. Communication cable 40 connects to central controller 16 at port 258. Associated with port 258 may be a serial card 260, which is coupled to bus 262.

Central controller 16 may include a master card 264, which card 264 may also be referred to as a second computer. Master card 264 includes a memory device 268 and a processor 270. Central controller 16 includes one or more device cards 30. Device cards 30 have ports 272 associated with them. Communication cables 44 may be used as a communication link for linking central controller 16 with controlled equipment 18. Controlled equipment 18 in the form of camera 32, in the present example, may include a camera control device 36.

In some instances, it may be desirable to include a box controller 38 located between a controlled device 18 and central controller 16. For example, VCR 34 has box controller 38 located between VCR 34 and central controller 16. Box controller 38 may include a processor 274 and memory 276. In embodiments using box controller 38, 138 central controller 16, 116 may simply pass a signal for the control of equipment 34 to the box controller 38, 138. Box controller 38, 138 in such instances may be programmed to utilize the invention in the same or analogous manner that controller 16 is programmed. That is, control signals sent from computer 20 may be passed to box controller 38 and accepted, loaded and processed in the same manner as will be described for the accepting, loading and performing of commands by central controller 16.

Figure 4:
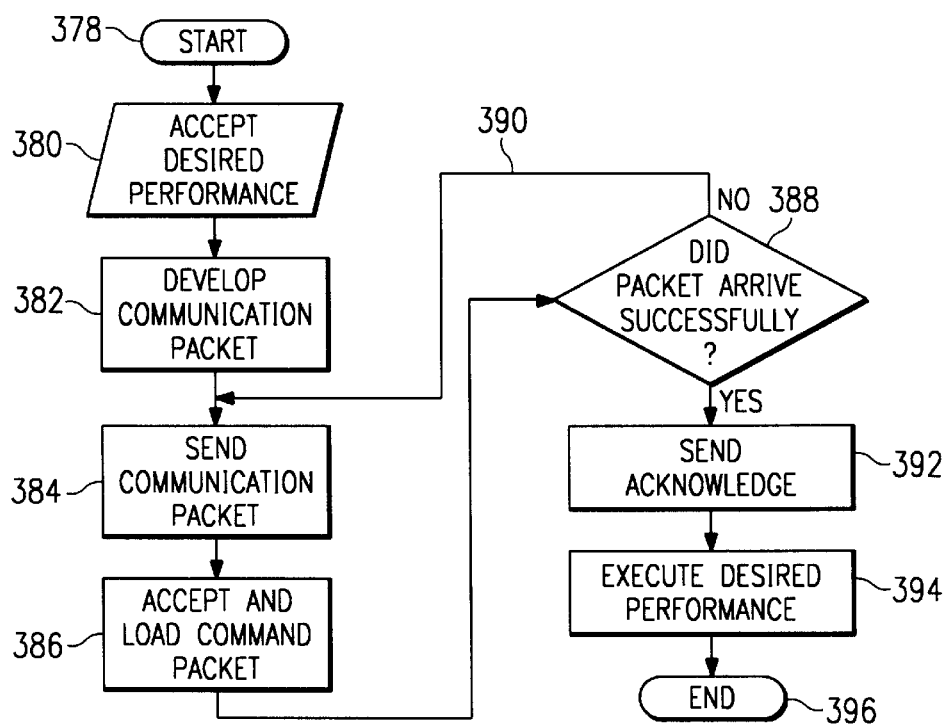
FIG. 4 is a flow chart showing the transfer and receipt of an example command between controlling device 12 and central controller 16 of FIGS. 1 and 3.

Referring now to FIG. 4, a flow chart showing aspects of the two-way communication of the present invention is presented. The process begins at block 378. If the operator of system 10 desires a particular operation to be performed with remote controlled equipment 18, the operator enters the desired performance through an interface, such as using pointing device 24 to select objects on a graphical user interface presented on screen 22. The entering of this information is represented by block 380. The information entered may be, for example, that a camera, e.g., camera 32, should be panned to the left with a particular speed.

Once the information is entered at block 380, a communication packet (or package) is developed as shown at block 382 and the communication packet is sent to the central controller 16 at step 384. The central controller 16 accepts and loads the command packet, as shown at step 386. Controller 16 will determine if the package arrived successfully as suggested by interrogatory box 388. If not, the communication packet will be sent again as suggested by path 390. In the present implementation, communication interface 114 in computer 20 knows to send the packet again because a "false" message is sent by central controller 16, 116 to computer 20. If the communication package arrived successfully at central controller 16, central controller 16 will send a message back to controlling device 12 indicating that the communication packet was received and understood as indicated by block 392, and then the command is executed by controller 16 as reflected by block 394. Having executed the desired performance at block 394, the process is complete as represented by 396. As noted at the outset, the process may be implemented in a number of ways other than the specific fashion described herein.

Referring again to FIG. 2, but also with reference to FIGS. 3 and 4, aspects of the user application tier 146 are programmed preferably using the programming language C++. The program involved with application tier 146 may be a resident program on memory device 252 and operable to run on processor 254. The family of C++ classes in the program may include a family of classes that includes a communication interface class called ADSAMXcomm as previously noted. When sending messages from controlling device 12, 112 to central controller 16, 116, the ADSAMXcomm 114 formats function calls in the proper message format and passes those messages through a connection, such as cable 40 to central controller 16, 116. The ADSAMXcomm 114 also handles receiving acknowledgments from the central controller 16, 116 that the message was received and understood as suggested at block 392 of FIG. 4 and as well as any time-out or error messages.

Specific C++ classes, based on the communication interface 114 class, handle messages relating to specific equipment. These can be readily customized (through C++ inheritance mechanisms) for a particular application. The communication interface 114 and related objects monitor serial port 256 for asynchronous messages generated by the central controller 16. The objects translate any messages from controller 16 into an appropriate C++ function and dispatch the function to the proper objects in the user application tier 146.

The AXCESS code running on the AMX AXCESS server or central controller 16 receives and loads communication packets which were sent by the application tier 146 through the serial card 260, as suggested at block 386 of FIG. 4. These packets are interpreted and executed by central controller 16, and as part of this process, the controller 16 captures the parameters sent in the message packet into one or more arrays of variables. A command is included to lock the array(s) of variables until the command with which the parameters were sent is processed. Without this, the variable array(s) could be modified by another communication packet before the command of the first communication packet uses the variables for its purposes.

If the message was properly received, the controller 16 sends back an acknowledgment to computer 20, otherwise it sends back a request for retransmission, as suggested by interrogatory 388 and path 390 of FIG. 4. The programmer of the central controller 16 may use normal AMX AXCESS syntax to code the responses for the button pushes and passes the stored parameters to a function. The AXCESS code, which may be in memory 268 of master card 264, also formats messages to be sent asynchronously to the user application tier 146 of controlling device 12, 112.

The message packets contain information for these two-way communications including the channel numbers and device numbers. The device number refers to a pseudo-device in that it may not correspond directly with a physical device or controlled equipment 18. That is, a single device number may be used for several physical devices or multiple device numbers could be used for different aspects of a single physical device. The actual equipment 18 to be controlled may be identified by one of the parameters sent in the communication packet. The AMX system preferably used for central controller 16 includes 255 channels per device. Thus, the communication package coming from the control device 12 may instruct central controller 16 of the device number, and of the channel number which indicates a desired function. As an aspect of the present invention, the communication package will also pass parameters related to the desired performance.

The desired performance is entered through an interface such as a GUI on screen 22 and then placed into a communication package, or packet, and sent to central controller 16. The communication package preferably has the following format:

TABLE 1

| Position 1 | Position 2 | Position 3 | Position 4 | Position 5 | Position 6 | Position 7 |
|---|---|---|---|---|---|---|
| Attention Dyte | Command Byte | Device Byte | Channel Byte | Length Byte | Integer or String | CHECKSUM |

An attention character prepares the AXCESS controller 16 for transmission. This character is typically $2A (*) for sending commands and is a $26 (&) for responses. The second position is a command byte. Commands 1–11 have previously been defined by AMX as shown on page 134 of the AMX Axcess Programming Guide, version 2.1, and thus, in this embodiment, the new command, "extended push," is used with a command number greater than 11. In the specific embodiment presented, a design choice was made to use 16 as the command number. A device byte follows next, followed by a channel byte. Next, the number of bytes in the data that is to follow is given. Then string or integer parameters which may be of varying sizes, follow. The communication packet is concluded by a checksum byte.

Figure 5:
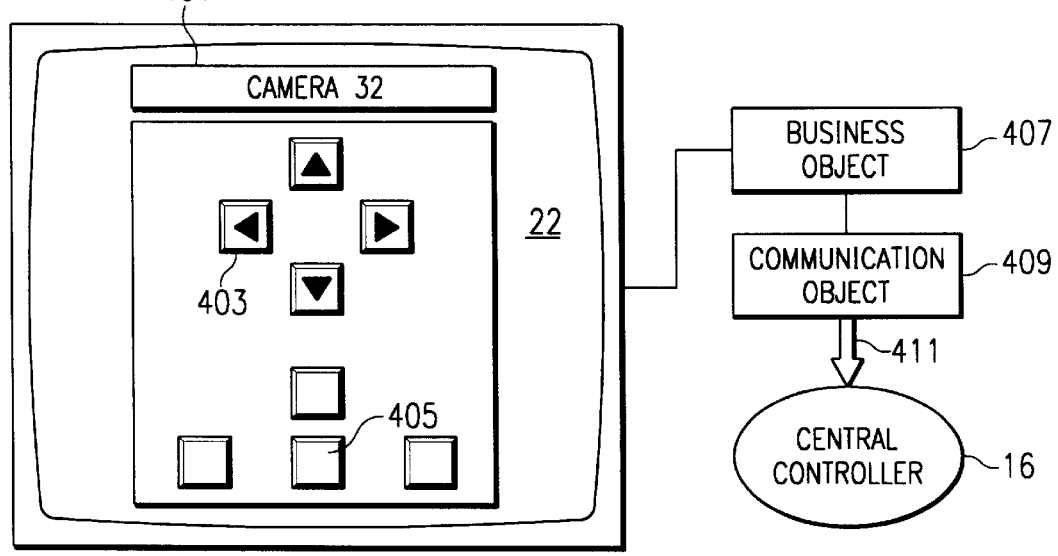
FIG. 5 is an elevation view of screen 22 combined with a block diagram of its interface with the software architecture of system 10.

Returning to the example of an operator who would like to make camera 32 move to the left (or pan to the left), the operator would first enter the desired performance. Referring now to FIG. 5, the operator may navigate through a graphical user interface on touch screen 22 of computer 20 to bring up a screen such as that shown in FIG. 5. Through navigating on screen 22, the user may raise the specific camera selector on the screen, such as shown by indicia 401. Having selected camera 32, the operator may then push a left pan button 403 and may select a speed for the camera movement, if desired, by pushing another button such as button 405. Other graphical user interfaces could be used for this and for other desired functions of equipment 18. Computer 20 through software held by memory 252 and processed by processor 254 recognizes the inputs made on screen 22 to be related to camera 32 and passes the information to business object 407 which represents the camera, and which in turn recognizes that the information should be passed to communication object 409, which is an aspect of interface 114 (FIG. 2). Communication object 409 prepares the communication packet as suggested by step 382 of FIG. 4. The communication packet is then sent to central controller 16 as suggested by arrow 411.

Figure 6A:
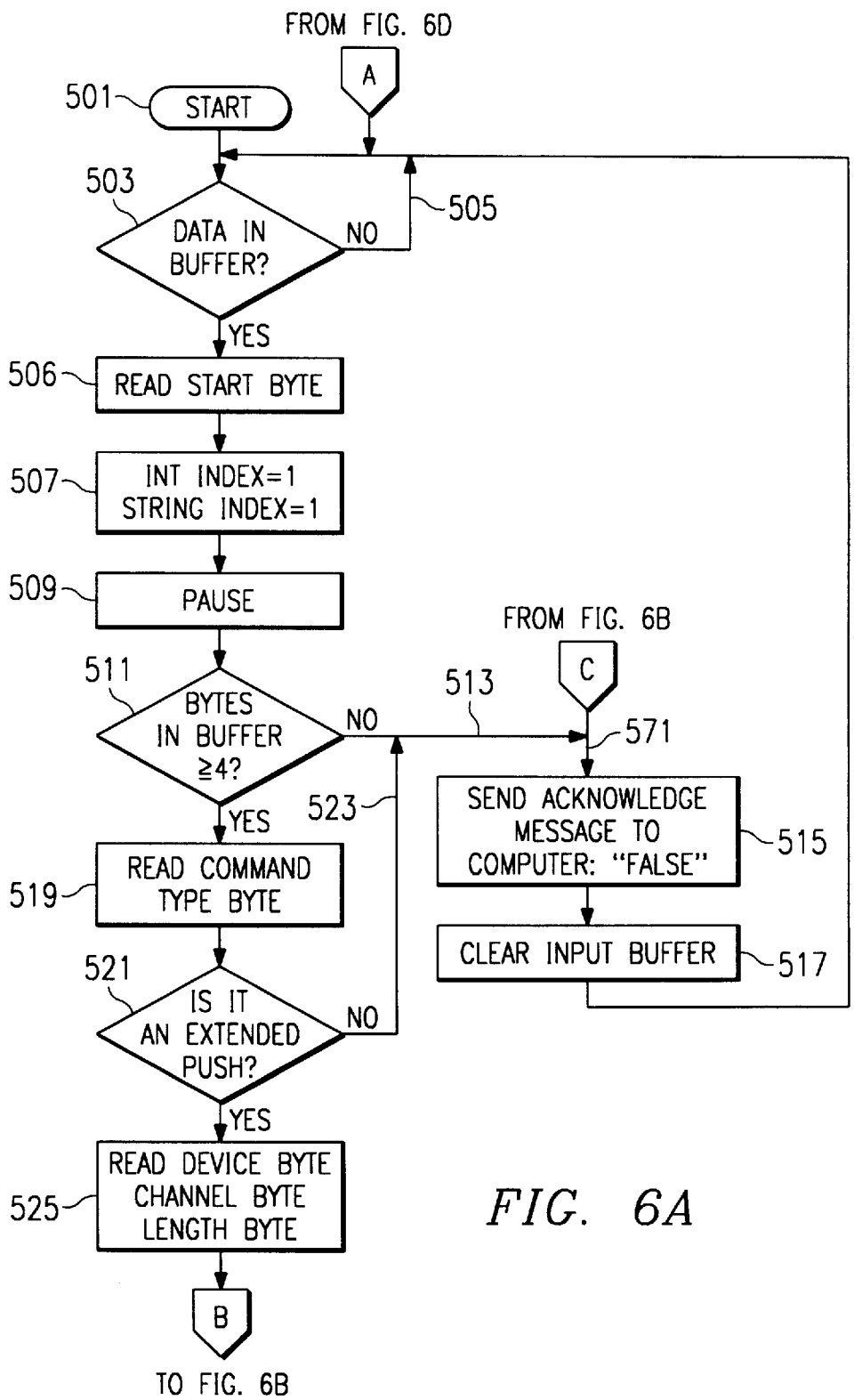
FIGS. 6A–D is a flow chart illustrating the accepting and loading of a communication packet by central controller 16.
Figure 6B:
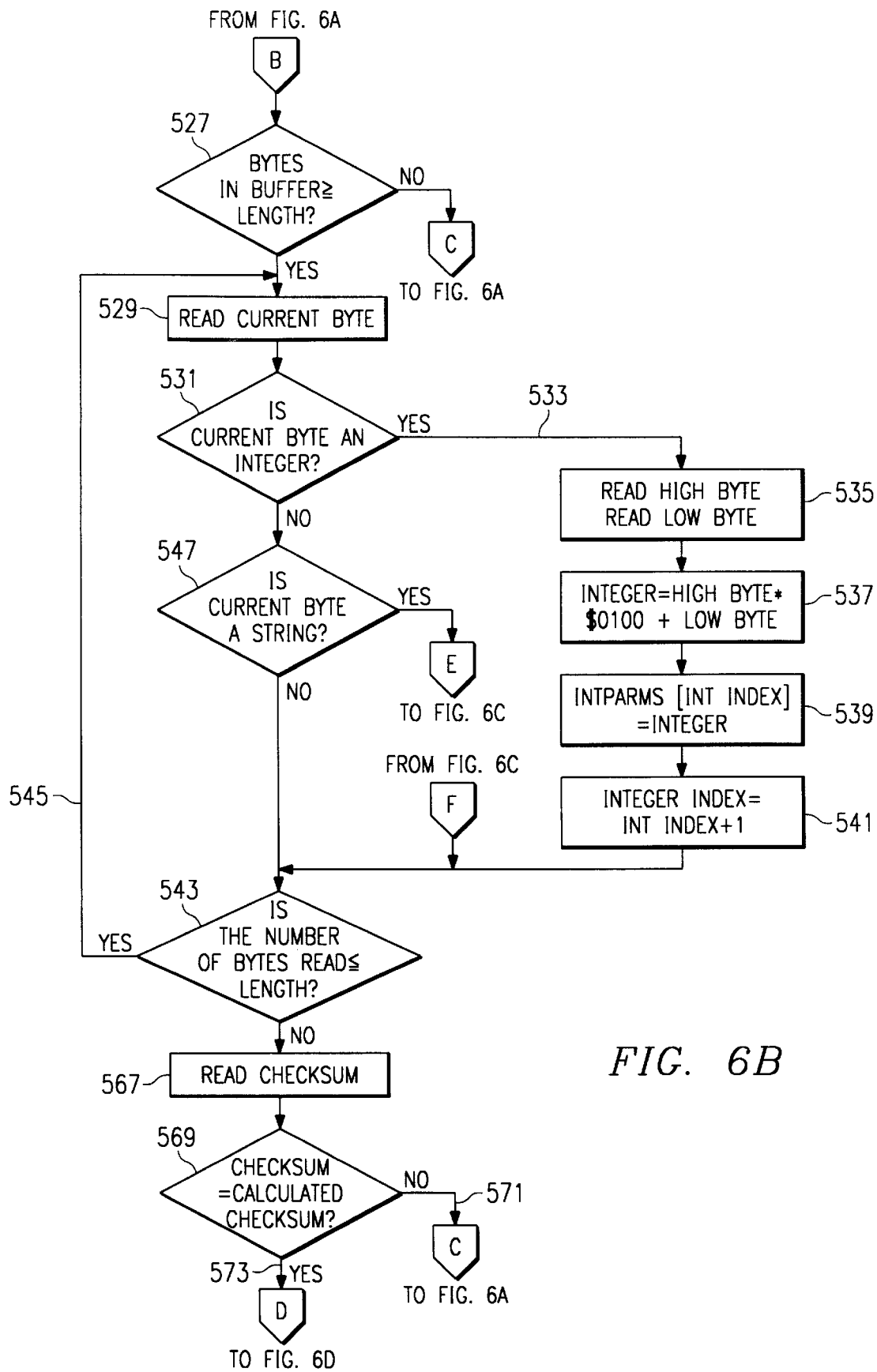
Figure 6C:
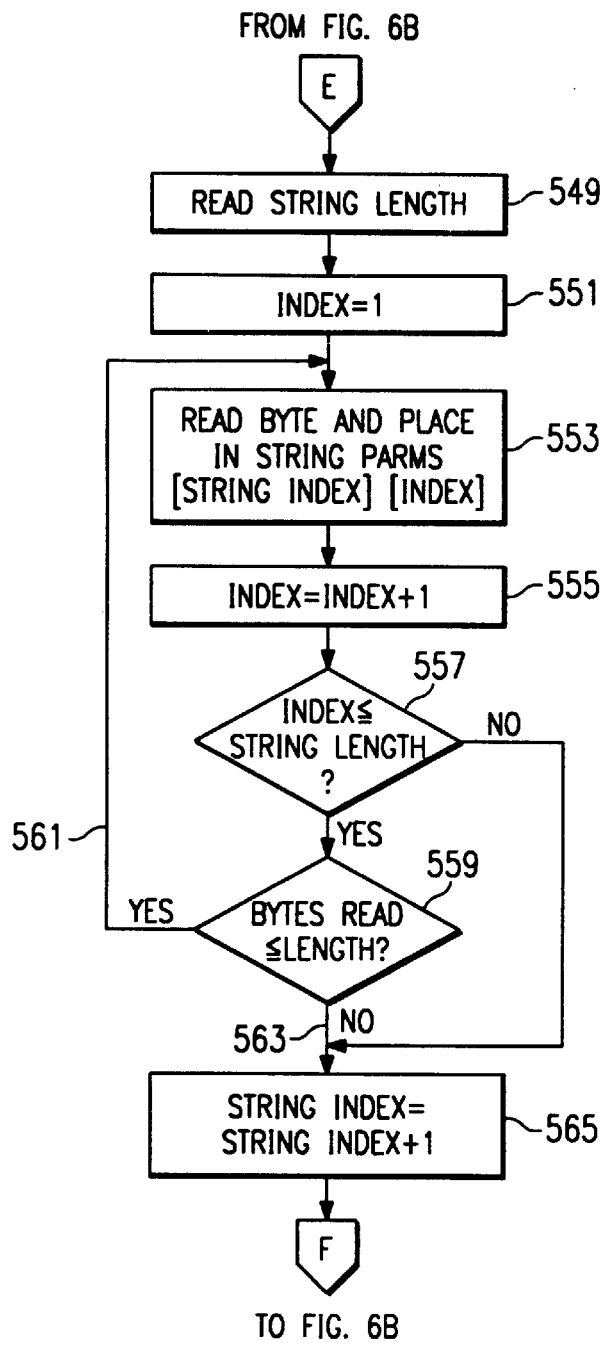

Referring now to FIGS. 6A–C, the process flow for receiving and loading a communication packet from computer 20 as delivered to central controller 16, and interpreted by master card 264 is shown. This process shows more fully what was indicated at blocks 386 and 388 of FIG. 4. Referring to FIG. 6A, after starting at block 501, master card 264 checks to see if any data is in a buffer on a bus 262 associated with card 260 as indicated by interrogatory box 503. If no data is found in the buffer, the process flow loops back as shown by path 505 to continue the interrogatory 503. Once data is found in the buffer, the start byte or attention byte is read at step 506. Next, at step 507, an integer index and string index are both initialized to hold a value of one. Then, at step 509, the system pauses to possibly receive additional data, which for a specific embodiment the system 10 pauses 1/10th of a second and then proceeds.

Master card 264 then determines whether the number of bytes in the buffer is greater than or equal to 4, as indicated by interrogatory box 511. Four bytes is used because a correctly packaged communication packet will contain at least four bytes. If the bytes in the buffer are not greater than or equal to four, the logic proceeds along path 513 to box 515. At box 515, a message is generated and sent back to computer 20, indicating "false", which signifies that if a communication was attempted by computer 20, it was unsuccessful, and should be resent. In preparation for a new messages arriving in the buffer, the buffer is cleared at step 517. The program then returns to the process flow just above interrogatory 503.

If the answer to interrogatory box 511 is that there are four or more bytes in the buffer, it proceeds to box 519, where the command-type byte is read. Next, at interrogatory box 521, the system considers whether the command type is the "extended push" type. An "extended push" command sends the device number, channel number, and parameters. If it is not an extended push command, the logic proceeds along path 523, which merges with path 513, taking the process flow to block 515, which has been described. In the present embodiment, only extended-push commands are utilized in communication packets from computer 20; however, if a standard AMX push command is desired, other embodiments might utilize such commands in addition to extended-push commands. If it is an extended push, the flow proceeds to step 525 where the master card 264 reads the device byte, channel byte, and length byte of the communication packet.

Referring to FIG. 6B, the next step is to consider at interrogatory box 527 whether or not the number of bytes in the buffer is greater than or equal to the length, as indicated by the length byte. If the number of bytes in the buffer is not greater than or equal to the length, the flow of the process goes to box 515 of FIG. 6A. If the bytes in the buffer is greater than or equal to the length, the process of reading the string or integer data begins at block 529.

To read the string or integer, the current byte is read at box 529. At interrogatory 531, a determination is made as to whether the current parameter is an integer. If it is, the process continues along path 533 to box 535, where the high and low bytes are read. In this regard, a normal variable here consists of sixteen bits, which is equal to two bytes, and of which one byte is the high byte and the other is the low byte. Next, the flow continues to process box 537 where the integer value is deciphered as shown. Next, at block 539, a one-dimensional array called "integer parameters" (abbreviated "INTPARMS") is loaded with the value. Note that the integer index was initialized back at block 507, and now the integer index is incremented at block 541. The process then proceeds to interrogatory box 543.

Interrogatory box 543 determines if the number of bytes read is less than or equal to the length. This interrogatory will become false once all the bytes of the current communication packet have been read since the index value was 1 on the first cycle. If the answer to interrogatory in box 543 is affirmative, the flow proceeds along path 545 back to box 529. If the next current byte that is read indicates that an integer parameter follows, the process flow will continue along path 533 and the next integer will be loaded as described above. If the next byte does not indicate an integer, the flow will proceed from interrogatory box 531 to interrogatory box 547.

At interrogatory box 547, a determination is made as to whether the current parameter is a string. If it is not a string, the flow drops back to interrogatory box 543 and will proceed as described above. If it is a string, the flow will proceed to box 549 as shown in FIG. 6C.

Referring to FIG. 6C, at box 549 the string length is read and a new index is set to 1 at box 551. Next, the following byte is read and placed in a portion of a two-dimensional array called "string parameters" (abbreviated "STRINGPARMS"). This occurs at box 553. At box 555, the index is incremented 1. Next, at interrogatory box 557 the system determines whether the new index is less than or equal to the string length. Again, because the index was originally incremented to 1 before the first pass through, this condition should not fail until all the bytes indicated by the length have been read. Assuming the answer to interrogatory at 557 is in the affirmative, interrogatory box 559 is reached.

At interrogatory box 559, the system asks whether the bytes read are less than or equal to the length. If the answer is yes, the flow proceeds along path 561 back to block 553. This process continues until the number of bytes read is greater than or equal to the length and the answer to interrogatory box 559 will be in the negative. The flow will then proceed along path 563 to box 565, where the string index is indexed by 1. Then, the flow proceeds to interrogatory box 543 on FIG. 6B.

Once the condition of interrogatory box 543 is negative, the checksum will be read at box 567. Then the decision is made as to whether or not the checksum is equal to the calculated checksum as indicated at interrogatory box 569. If it is not, the flow proceeds along path 571, which leads to box 515 of FIG. 6A. If the answer is in the affirmative, the flow continues along path 573 to box 575 of FIG. 6D.

Figure 6D:
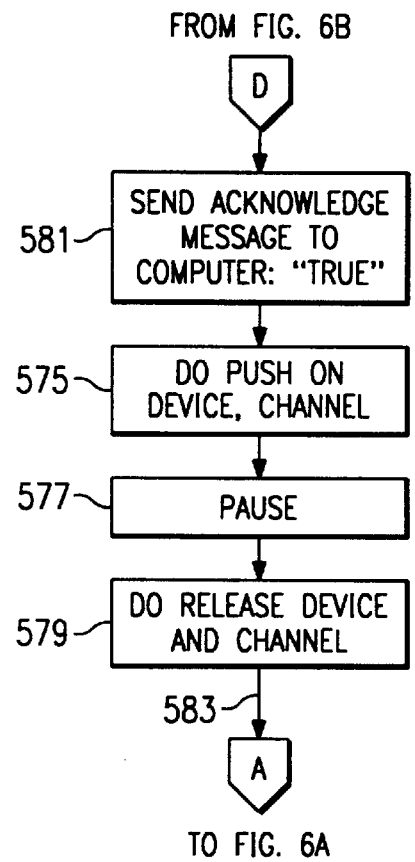

Referring to FIG. 6D, the process steps of blocks 392 and 394 of FIG. 4 are shown more fully. A message is sent back to computer 20 with the message "true" indicating successful at block 581. At box 575 the program will do a "push" on the device and channel utilizing the parameters in STRINGPARMS or INTPARMS. A "push" is an AMX command that is called with a device number and channel. In this case, the called command is programmed to consult INTPARMS or STRINGPARMS for the parameters that might be needed. That is, now having loaded the parameters and the desired performance, the appropriate function and parameters are utilized by the software of master card 264 to perform the action.

The flow pauses at box 577, which in the specific embodiment is for 1/10th second. Next, the standard AMX commands of releasing the device and channel is performed as indicated at process block 579. The process can then continue in its looping fashion as suggested by path 583.

As noted earlier, aspects of the present invention may be implemented in a number of ways, but to illustrate here, a specific programming approach is presented. On the side of computer 20, the functions and protocols for packaging and sending the function and parameters are programmed in communication interface 114. The variables and constants needed should preferably be defined in the program on computer 20. For example, the camera device number is defined. An excerpt from the code to do this might look like that shown below in Table 2.

TABLE 2 const short cameraDevice = 130;

The channel numbers on the side of computer 20 should also be defined. An example of code which may be used to define one channel is shown below in Table 3.

TABLE 3 const short CameraPanLeft = 74;

The functions that will be called by the business object 407 of computer 20 are also defined. Thus for the present example of panning the Camera left (PanLeft), the parameters that need to be passed with such a command are defined, the command itself, as well as the corresponding parts for creating an AMX message packet for PanLeft. An example of code that may be used for these is shown below in Table 4.

TABLE 4

```
bool
VPSAMX::PanLeft (int cameraId, bool startStop, int cameraSpeed)
{
  bool rtn = true;
  //PROTECT_BEGIN PanLeftFunctionBodyBefore
  //PROTECT_END
  string message = "PanCameraLeft on AMX called for Camera - ";
  message += str (cameraId);
  message += ",";
  message += textBool (startStop);
  message += ", camera speed = ";
  message += str(camera Speed);
  IDLAMXMessage CameraMsg (CameraDevice, CameraPanLeft);
  CameraMsg.SetMessageType (amxmDoExtendedPush);
  CameraMsg.AddParm(cameraId);
  CameraMsg.AddParm(startStop);
```

TABLE 4-continued

```
  CameraMsg.AddParm(cameraSpeed);
  SendMessage (CameraMsg, message);
  //PROTECT_BEGIN PanLeftFunctionBodyAfter
  //PROTECT_END
  return rtn;
```

The PanLeft command takes the information from the interface, e.g., GUI on screen 22, and then builds a portion of the AMX message using initially the camera device number and the channel number. It is then instructed to do "an extended push." The extended push passes more than just the device number and channel, but is able to pass the desired parameters. This allows for efficiencies in software programming, maintenance, and reconfiguration. The desired parameters in this instance are then added to the communication package and may include, for example, the specific camera, the start-stop aspect, and the camera speed. Note that the camera ID is not just telling it which card 30 in central controller 16, but the actual camera equipment 34. A look-up table may be utilized on the side of central controller 16 to figure out which card 30 is appropriate for the specific camera 34 identified. This feature allows for easier reconfiguration and addition of equipment.

The message package developed by communication interface 114 on computer 20 is in a format to be received by the AMX controller 16 as previously noted. The message packet may be prepared by a function called by the business object 407 of computer 20. An example of this business object code in computer 20 might be as follows:

TABLE 5

```
bool
CameraVideo::PanLeft (bool moveCamera, CameraSpeedRange
speedRange)
{
  bool rtn;
  if (speedRange == csrStep)
  {
    if (moveCamera)
    {
      CameraPosition newCameraPosition = CurrentPosition();
      CameraPosition stepCameraPosition;
      stepCameraPosition.SetPanPosition(PanSpeeds[csrStep]);
      newCameraPosition -= stepCameraPosition;
      //call to AMX
      rtn = RemoteCtl().GotoPreset(RemoteCtlID(),
        newCameraPosition, PanSpeeds[csrSlow],
        TiltSpeeds[csrSlow], ZoomSpeeds[csrSlow],
        FocusSpeeds[csrSlow]);
    }
  }
  else
  {
    //call to AMX
    rtn = RemoteCtl().PanLeft(RemoteCtlID(), moveCamera,
      PanSpeeds[speedRange]);
  }
  if (rtn && moveCamera)
  {
    //set Selected on list and notiffy observers
    rtn = MovedToPreset(NULL);
  }
  return rtn;
}
```

In addition to preparing the message, the parameters that are being passed from computer 20 to central controller 16 should be prepared in some instances. The code that may be used to accomplish is shown below:

TABLE 6

```
bool
IDLAMXMessage::AddParm(unsigned parmValue)
{
   //PROTECT_BEGIN AddParm01FunctionBodyBefore
   //PROTECT_END
   operator+=(AMXIntegerParm);
   operator+=((byte)(parmValue / 0x0100));
   operator+=((byte)(parmValue % 0x0100));
   if (MessageType() == amxmDoExtendedPush)
   {
      IncExtendedInfoLength(3);
   }
   return true;
}
```

Similar programming occurs on master card 264 of controller 16, which in the preferred embodiment is an AMX system and is programmed using AMX code. On this side, device and channel definitions are also established. For example, the device number for all messages from the first computer 20 may be defined with a specific device number; e.g., all the equipment 18 may have a single device number such as 130, which is the case for the present example.

A channel for the PanLeft command or function call on the AMX side (i.e., on controller 16) is typically programmed to match the same channel as that on the side of computer 20. On the side of central controller 16, the PanLeft function could be defined in code as follows:

TABLE 7

| CameraPanLeft | =74 |
|---|---|

When a performance command is sent from computer 20 to central controller 16, central controller 16 must be able to interpret the parameters being sent. Thus, for the indicated channel, the parameters must be defined. Continuing the present example, the parameters for camera movement may be as follows in Table 8:

TABLE 8

| CAMERA_SELECTED | =1 |
|---|---|
| CAMERA_STATE | =2 |
| CAM_SPEED_PARM | =3 |

The Pan Camera Left function is also defined in central controller 16. It is designated to operate on the same three parameters as were sent from computer 20. This will be called by the push command shown in Table 13, below. An example of specific code that might be used to define such a function is shown below.

TABLE 9

```
Define_Call 'Pan Camera Left' (SelectedCameraIn, StartState, Speed)"
{
   Call 'Stop Camera Pan' (SelectedCameraIn)
   If (StartState)
   {
      Call 'Set Pan Speed' (SelectedCameraIn, Speed)
      On[CameraPanTilt[SelectedCameraIn],PAN_LEFT_CHANNEL]
      Call 'Not On Student' (SelectedCameraIn)
   }
}
```

And the Stop Camera Pan function would also be defined, such as by the code found in Table 10 below.

TABLE 10 (D)

```
Define_Call 'Stop Camera Pan' (SelectedCameraIn)
{
   Off [CameraPanTilt[SelectedCameraIn],PAN_LEFT_CHANNEL]
   Off [CameraPanTilt[SelectedCameraIn],PAN_RIGHT_CHANNEL]
}
```

In addition to defining the constants, variables, and functions for the specific performance desired, the necessary function for receiving and loading the data coming in from computer 20 must be defined. The logical flow of this process was explained above with respect to FIGS. 6A–D, but an example of the code that might be used to define such a call is shown below in Table 11.

TABLE 11

```
Define_Call 'Receive VPS Command'
{
   If (Length_String (VPSControlBuffer))
   {
      If (START_OF_COMMAND = Get_Buffer_Char
      (VPSControlBuffer))
      {
         RCheckSumCalc = START_OF_COMMAND
         If (Length_String(VPSControlBuffer) >= 4)
         {
            CommandType = Get_Buffer_Char(VPSControlBuffer)
            RCheckSumCalc = RCheckSumCalc + CommandType
            Select
            {
               Active (CommandType =
   RCMD_DO_EXTENDED_PUSH): (* Do extended push *)
               {
                  CurrentDevice = Get_Buffer_Char(VPSControlBuffer)
                  RCheckSumCalc = RCheckSumCalc + CurrentDevice
                  CurrentChannel = Get_Buffer_Char(VPSControlBuffer)
                  RCheckSumCalc = RCheckSumCalc + CurrentChannel
                  CommandLength =
                  Get_Buffer_Char(VPSControlBuffer)
                  RCheckSumCalc = RCheckSumCalc + CommandLength
                  On [PushWait]
                  Wait 1
                  {
                     If ( Length_String(VPSControlBuffer) >
                     CommandLength )
                     {
                        TempCount = 1
                        SParmIndex = 1
                        IParmIndex = 1
                        Medium_While ( TempCount <=
                        CommandLength )
                        {
                           ParmType =
                           Get_Buffer_Char(VPSControlBuffer)
                           TempCount = TempCount + 1
                           Select
                           {
                              Active (ParmType = PARM_INT):
                              {
                                 IntHiByte =
                                 Get_Buffer_Char(VPSControlBuffer)
                                 IntLoByte =
                                 Get_Buffer_Char(VPSControlBuffer)
                                 RcheckSumCalc = RCheckSumCalc
                                 + ParmType + IntHiByte +
                                 IntLoByte
                                 IntParms{IParmIndex] =
                                 (IntHiByte * $0100) +
                                 (IntLoByte)
                                 TempCount = TempCount + 2
                                 IparmIndex = IParmIndex + 1
                              }
                              Active (ParmType = PARM_STRING):
                              {
                                 ParmLength =
                                 Get_Buffer_Char(VPSControlBuffer)
                                 TempCount = TempCount + 1
```

TABLE 11-continued

```
                    RcheckSumCalc = RCheckSumCalc +
                    ParmType + ParmLength
                    ParmIndex = 1
                    Medium_While ( ParmIndex <=
                    ParmLength AND TempCount <=
                    CommandLength)
                    {
                       StringParms[SParmIndex][ParmIndex] =
                       Get_Buffer_Char(VPSControlBuffer)
                       RcheckSumCalc = RCheckSumCalc
                       +
                       StringParms[SParmIndex][ParmIndex]
                       TempCount = TempCount + 1
                       ParmIndex = ParmIndex + 1
                    }
                    Set_Length_String (StringParms[SPa
                    rmIndex],ParmLength)
                    SparmIndex = SParmIndex + 1
                 }
              }
           }
           RCheckSumCalc = RCheckSumCalc & $FF
           CheckSumIn = Get_Buffer_Char(VPSControlBuffer)
           If (CheckSumIn - RCheckSumCalc)
           {
(* send_string
0,"['',itoa(currentDevice),',',itoa(CurrentChannel),']',$0A,$0D"*)
              Call 'Send Ack' (TRUE)
              Do_Push (CurrentDevice, CurrentChannel)
              Wait
              {
                 Do_Release(CurrentDevice,CurrentChannel)
              }
           }
        }
        Else
        {
           Clear_Buffer |PSControlBuffer
           Call 'Send Ack' (FALSE)
        }
        Else
        {
           Clear_Buffer VPSControlBuffer
           Call 'Send Ack' (FALSE)
        }
     }
   }
  }
  Else
  {
     Clear_Buffer VFSControlBuffer
     Call 'Send Ack' (FALSE)
  }
  }
  Else
  {
     Clear_Buffer |PSControlBuffer
     Call 'Send Ack' (FALSE)
  }
 }
}
```

Once all the variables, constants and functions are defined in the software of central controller 16, which may be stored in memory 268 and processed by processor 270, the actual program utilizing the functions would need to be programmed as well. With the present invention, instead of having to write a device-specific piece of program for each and every function of a specific device, it is possible to have more of a general function call with parameters, such that the specific function could be used with any of a number of different devices of the same type. In the present example, the pan-camera-left command may be used with not only camera 32, but other cameras that might be attached to the system 10 without requiring additional functions to be written. If a different camera was to be panned left, by passing the appropriate parameter indicating the different camera id being utilized, the piece of software for the same pan-left-command could be used for the other camera as well as for camera 32.

The program on master card 264, once operating, has a continuous loop that continues to check the internal bus 262. The continuous loop of the program in the master card 264 cycles through the define-program portion of the program until it reaches an end of program. Then it checks the wait and wait-until lists, turns off expired pulses, handles the master card RS232 communications, and updates the communication bus. It then proceeds immediately to the start of the program again—thus forming a continuous loop.

The program call in master card 264 for accepting commands from computer 20 is an aspect of the present invention. The call includes a call to use the VPS command which was shown in Table 11, above. The line of AMX code that would call this command is shown below in Table 12.

TABLE 12

Call 'Receive VPS Command'

Once the desired performance command is loaded, including parameters, the program on master card 264 will be instructed to do a "push," which is an established AMX command, but will now utilize the parameters passed as an aspect of the present invention. In the example, the push for panning the camera left uses the VPS device number and the camera-pan-left channel, and this in turn pulls the pan-camera-left portion of the code with the three variables selected: camera, camera state, and camera speed. The portion of the code that may be used to accomplish this in one embodiment is shown below in Table 13.

TABLE 13

```
Push [VPS,CameraPanLeft]       (* Pan left (on/off) on selected
camera*)
{
   SelectedCamera = IntParms[CAMERA_SELECTED]
   CameraState = IntParms[CAMERA_STATE]
   CameraSpeed = IntParms [CAM_SPEED_PARM]
   Call 'Pan Camera Left' (SelectedCamera, CameraState, CameraSpeed)
}
```

Although the present invention has been described in detail, it should be understood that various changes, substitutions, and alterations can be made hereto without departing from the spirit and scope of the invention as defined by the appended claims.

What is claimed is:

1. A method of communicating between a programmable computer and a central controller for remote control of plural equipment devices, comprising the steps of:

developing a program segment and storing the program segment on memory associated with the central controller, the program segment for supporting a desired control operation for each of the plural equipment devices, the program segment operable to interpret variable parameters;

developing and sending from the programmable computer to the central controller a command with a device number, channel number, and variable parameters representative of the desired control operation on the plural remote-controlled equipment devices;

accepting and loading the command with device number, channel number, and variable parameters into memory of the central controller; and performing the desired control operation on at least one of the plural equipment devices at the direction of the central controller using the program segment by interpreting the variable parameters.

2. The method of claim 1, wherein the step of developing the command comprises the steps of:

receiving input including identification of the equipment to be controlled and desired performance;

packaging the input as a command with a specific device number, channel number, and variable parameters corresponding to the desired performance; and transmitting the packaged input to the central controller.

3. The method of claim 2, wherein the step of receiving input comprises the steps of displaying performance options on a screen and identifying the desired performance options by selection with a pointing device.

4. The method of claim 1 further comprising the step of determining if the command with the device number, channel number, and variable parameters arrived successfully at the central controller with the programmable computer.

5. The method of claim 4 further comprising the steps of sending a message from the central controller to the programmable computer indicating if the command with a device number, channel number, and variable parameters arrived successfully at the central controller or not.

6. The method of claim 4 wherein the step of loading comprises the step of loading the variable parameters into an array in a memory device in the central controller.

7. The method of claim 6 further comprising the step of calling a function, which is stored in the memory device of the central controller, based on the device and channel numbers, the function comprising the program segment.

8. A computer system for remotely controlling equipment devices, the system comprising:

a first computer having a first processor and first memory for operating a first computer program;

a central controller having a second processor and a second memory for operating a second computer program, the second memory storing a program segment for performing a desired control operation on each of the equipment devices, the program segment operable to interpret variable parameters;

a communications link coupled to the first computer and the central controller for allowing bidirectional communication therebetween;

a first remote-controlled device coupled to and controller by the central controller; and wherein the first computer is operable to run the first program to develop and send a command with a device number, channel number, and variable parameters corresponding to a desired performance of the remote-controlled equipment device to the central controller, the central controller operable to use the program segment for directing the equipment device to perform the desired control operation.

9. The computer system of claim 8 further comprising:

a second remote-controlled device coupled to the central controller for control thereby;

means for receiving input from an operator including the device to be controlled and desired performance of the device;

means for packaging the input as a command with a specific device number, channel number, and variable parameters corresponding the desired performance; and means for transmitting the packaged input to the central controller.

10. The computer system of claim 8 further comprising means for loading the command having a device number, channel number, and variable parameters into the second memory for processing.

11. The computer system of claim 8 wherein the second processor and second memory are operable to load the command having the device number, channel number, and variable parameters into the second memory in the central controller for processing.

12. The computer system of claim 11 wherein the second processor and second memory are operable to determine if the command with the device number, channel number, and variable parameters arrived successfully at the central controller from the first computer; and send a message from the central controller to the first computer indicating if the command with the device number, channel number, and variable parameters arrived successfully at the central controller.

13. The computer system of claim 8 wherein the second processor and second memory are operable to load the variable parameters sent from the first computer into an array in the second memory of the central controller.

14. The computer system of claim 13 wherein the second processor and second memory are operable to call a function to carry out the desired performance of the selected equipment based on the device number and channel number and wherein the function utilizes the variable parameters in the array.

15. A computer system for remotely controlling plural equipment devices, the system comprising:

a first computer having a first processor and a first memory for operating a first computer program;

a central controller having a master card with a second processor and a second memory for operating a second computer program;

a communications link coupling the first computer and the central controller;

the central controller having a port for connecting with equipment to be controlled;

wherein the first computer if operable to run the first program to:

accept from an operator through an interface a desired performance command indicating a desired operation or equipment that may be attached to the port of the second computer and accepting at least one performance parameter along with the desired performance command; and develop a communications packet that includes variable parameters, the variable parameters including an identification of the equipment to be controlled, the desired performance command, and the performance parameter, which may be sent over the communications link to the second computer; and wherein the central controller is operable to run the second program to perform the following steps:

accept the communications packet sent by the first computer;

interpret the communication packet sent from the first computer in order to identify the equipment to be controlled, the desired performance command, and the performance parameters, call a command function corresponding to the desired performance command for developing control signals to be sent to the identified equipment, the command function operable to develop control signals for plural equipment devices, and pass the performance parameter to the command function.

16. The System of claim 15 wherein the central controller is operable to run the second program to:
   develop a response message to be sent to the first computer over the communications link advising the first computer of a successful or unsuccessful receipt of the communications packet, and
   send the response message to the first computer over the communications cable.

17. The system of claim 15 wherein the second processor and second memory are operable to call a push command as the command function.

18. The System of claim 15 further comprising a plurality of equipment coupled to the central controller for remote control thereby.

19. The system of claim 15 further comprising a graphical user interface associated with the first computer for receiving input from an operator.

* * * * *